United States Patent
Hamada

(10) Patent No.: US 6,377,299 B1
(45) Date of Patent: Apr. 23, 2002

(54) VIDEO QUALITY ABNORMALITY DETECTION METHOD AND APPARATUS

(75) Inventor: Takahiro Hamada, Saitama (JP)

(73) Assignee: KDD Corporation (JP)

( * ) Notice: Subject to any disclaimer, the term of this patent is extended or adjusted under 35 U.S.C. 154(b) by 0 days.

(21) Appl. No.: 09/274,675

(22) Filed: Mar. 24, 1999

(30) Foreign Application Priority Data

Apr. 1, 1998 (JP) .......................................... 10-105596

(51) Int. Cl.$^7$ .......................... H04N 17/00; H04N 5/21
(52) U.S. Cl. ...................... 348/192; 348/180; 348/189; 348/607; 348/608; 382/275; 382/191; 382/280
(58) Field of Search .............................. 348/192, 189, 348/180, 184, 185, 715, 554, 555, 607, 608, 627, 909; 382/239, 278, 280, 286, 191, 274, 275; 358/533, 504; 386/21, 76, 113, 114; H04N 17/00, 5/21

(56) References Cited

U.S. PATENT DOCUMENTS

| | | | | |
|---|---|---|---|---|
| 4,542,416 A | * | 9/1985 | Honjo et al. | 386/88 |
| 4,737,847 A | * | 4/1988 | Araki et al. | 348/161 |
| 5,221,967 A | * | 6/1993 | Ward et al. | 348/180 |
| 5,329,311 A | * | 7/1994 | Ward et al. | 348/180 |
| 5,446,492 A | * | 8/1995 | Wolf et al. | 348/192 |
| 5,570,196 A | * | 10/1996 | Miyaguchi | 386/1 |
| 5,596,364 A | * | 1/1997 | Wolf et al. | 348/192 |
| 5,808,671 A | * | 9/1998 | Maycock et al. | 348/180 |
| 5,963,249 A | * | 10/1999 | Kim | 348/178 |
| 6,014,179 A | * | 1/2000 | Kobayashi et al. | 348/556 |
| 6,028,626 A | * | 2/2000 | Aviv | 348/152 |
| 6,057,892 A | * | 5/2000 | Borer | 348/699 |
| 6,291,983 B1 | * | 9/2001 | Clarke, Jr. et al. | 324/102 |
| 6,297,858 B1 | * | 10/2001 | Yang | 348/731 |

* cited by examiner

Primary Examiner—Wendy R. Garber
Assistant Examiner—Jean W. Désir
(74) Attorney, Agent, or Firm—Westman, Champlin & Kelly, P.A.

(57) ABSTRACT

A waveform analysis unit divides digital data of a video signal stored in a Y memory and a C memory into small blocks, and conducts average value separation and normalization on each of the small blocks. A 1/f fluctuation measuring unit first derives a self-correlation function for each of the normalized small blocks, folds back the self-correlation function to the negative side, and conducts correction processing for making an average self-correlation function over a predetermined section equal to 0. Subsequently, the 1/f fluctuation measuring unit conducts Fourier transform on the corrected self-correlation function, derives a power spectrum, and conducts straight line approximation of the power spectrum. The 1/f fluctuation measuring unit then derives a fluctuation value of the power spectrum from the approximate straight line. An abnormality determination unit makes a determination on video quality abnormality on the basis of the variance value of the small block, coefficients of the approximate straight line derived by the straight line approximation, and the fluctuation value.

5 Claims, 6 Drawing Sheets

(POWER SPECTRUM)

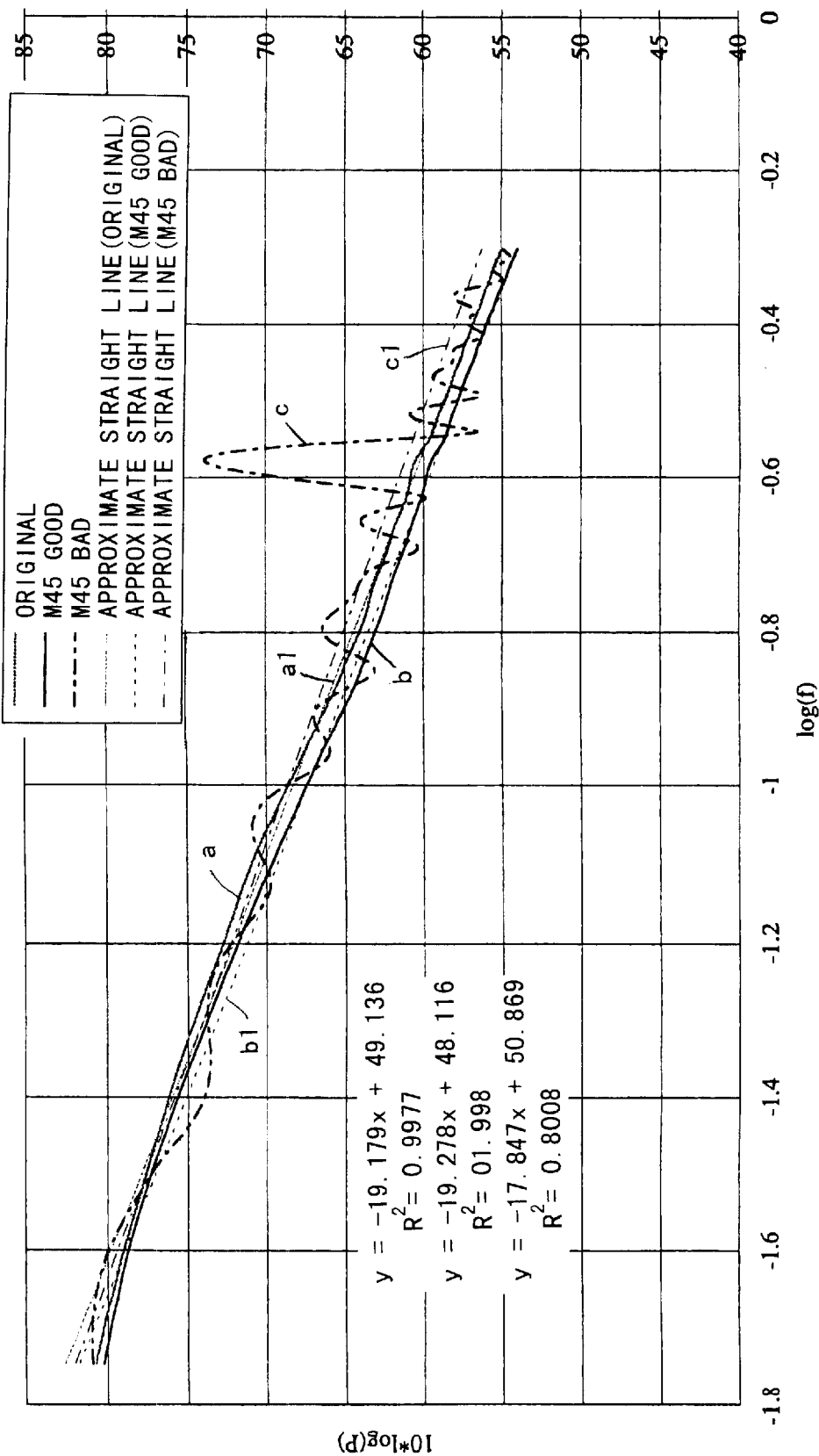

VIDEO QUALITY ABNORMALITY DETECTION METHOD AND APPARATUS

BACKGROUND OF THE INVENTION

1. Field of the Invention

The present invention relates to a video quality abnormality detection method, and apparatus, for detecting a quality abnormality of a video reproduced by a video device or a video transmitted through a provided communication channel.

2. Description of the Related Art

Those who are engaged in providing or transmitting television videos are obligated to deliver videos of high quality to customers. Television video providers, such as broadcasting stations, often reproduce recorded videos and broadcast them. In such a case, it is necessary to always monitor a reproduced video to determine whether there has occurred an abnormality in the reproduced video. Furthermore, communication companies transmitting television videos need to always monitor the television video to determine whether there has occurred an abnormality in video quality due to an abnormality on the transmission channel.

Heretofore, therefore, a video which is being provided is displayed on a monitor device. A person in charge always monitors the displayed video, and detects a video quality abnormality. If an abnormality is detected, then switchover to a stand-by video device is conducted for reproduction or switchover to a stand-by channel is conducted for transmission.

In the above described way of detection of a video quality abnormality, however, mental and physical burdens of the person in charge are heavy. Furthermore, there is a problem that there are differences in quality abnormality detection between individuals. There is also a problem that the above described way is economically disadvantageous. A method for detecting a quality abnormality mechanically without using a person has been studied. However, a quality abnormality detection apparatus which can be actually used has not yet been proposed.

SUMMARY OF THE INVENTION

In view of the above described conventional technique, the present invention has been made. An object of the present invention is to provide a quality abnormality detection method, and apparatus, capable of digitally analyzing a television signal and detecting a video quality abnormality.

To accomplish the above object, the present invention is characterized in that a video quality abnormality detection method comprises: dividing a digitized video signal into a plurality of blocks, normalizing an original signal with each of divided blocks, as a unit, so as to make a power sum of an AC component constant, deriving a power spectrum on the basis of data resulting from the normalizing, deriving a fluctuation value from an approximate straight line of the power spectrum and the power spectrum, and detecting the video quality abnormality from at least a variance of the signal of the block, coefficients of the approximate straight line, and the fluctuation value of the power spectrum.

Secondly, the present invention is characterized in that a video quality abnormality detection apparatus comprises: storage means for storing a digitized luminance signal and a color-difference signal, variance value computation means for dividing the luminance signal and the color-difference signal stored in the storage means into blocks, and deriving variance values of each block, normalization means for deriving normalized signals each having a constant variance value, on the basis of the variance values derived by the variance value computation means, self-correlation function correction processing means for deriving average self-correlation functions within the block from the normalized signals outputted from the normalization means, folding back each of the average self-correlation functions to a negative side, and making the average self-correlation functions over a predetermined section equal to 0 or nearly 0, power spectrum straight line approximation means for conducting Fourier transform on the self-correlation functions derived by the self-correlation function correction processing means, deriving power spectra, and approximating the power spectra by straight lines, fluctuation value computation means for deriving fluctuation values of the power spectra from the approximate straight lines, and a means for making a determination on video abnormality on the basis of the variance values derived by the variance value computation means, coefficients of the approximate straight lines derived by the power spectrum straight line approximation means, and the fluctuation values derived by the fluctuation value computation means.

According to the invention, it becomes possible to make a determination as to whether the video is normal or abnormal in real time mechanically without intervention of a person.

BRIEF DESCRIPTION OF THE DRAWING

FIG. 13 is a graph showing a fluctuation value of self-correlation function Fourier transform obtained by an experiment of the present invention.

DETAILED DESCRIPTION OF THE PREFERRED EMBODIMENTS

Figure 1:
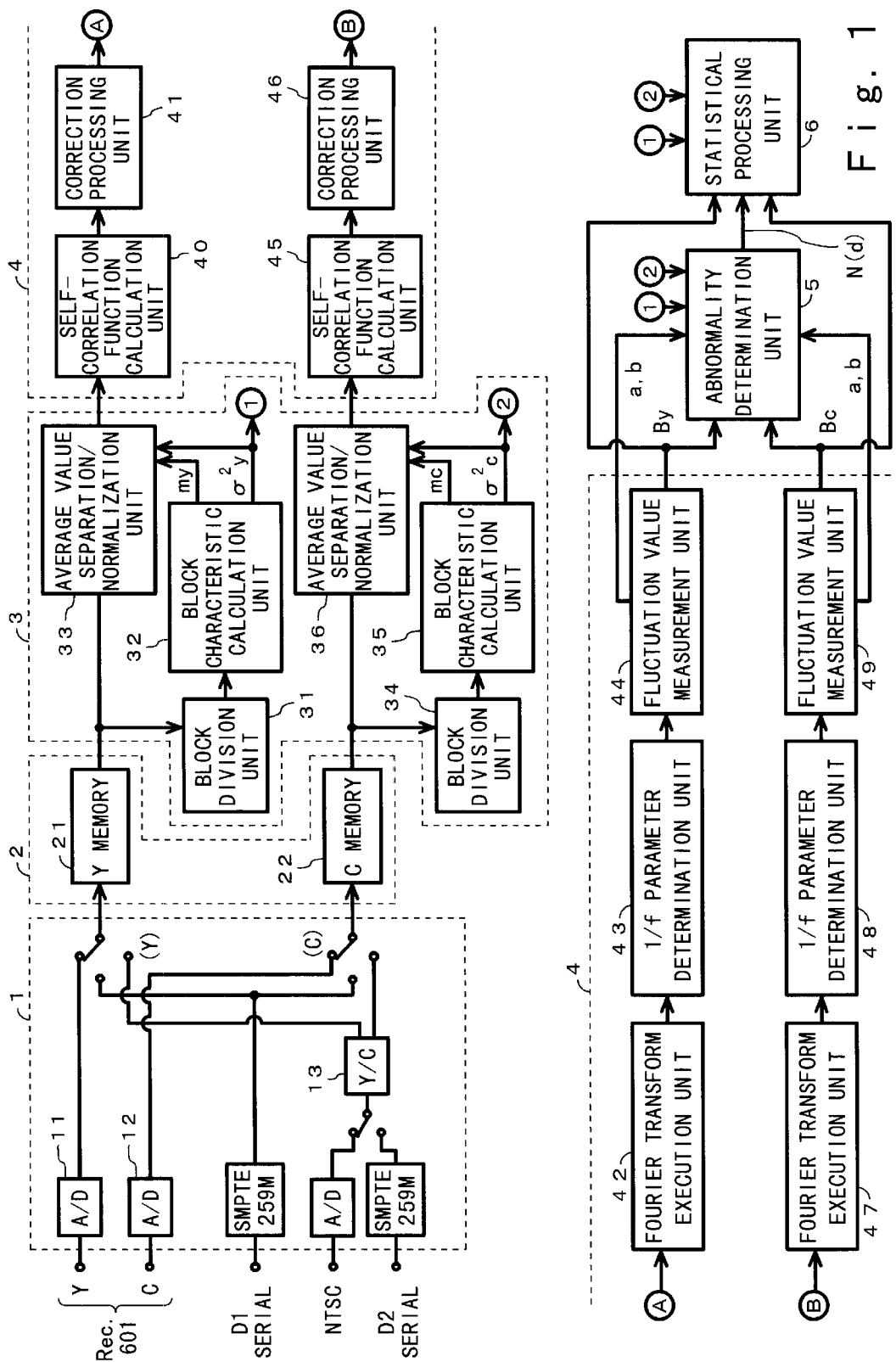
FIG. 1 is a block diagram showing the configuration of an embodiment according to the present invention.

Hereafter, the present invention will be described in detail by referring to the drawing. FIG. 1 is a block diagram showing the configuration of an embodiment according to the present invention.

As illustrated, the embodiment includes an input unit 1 of video signal, a memory unit 2 for storing video signal inputted from the input unit 1, a waveform analysis unit 3 for analyzing a waveform of the video signal stored in the memory unit 2, a 1/f fluctuation measurement unit 4 (where f is the frequency) for measuring the waveform fluctuation on the basis of a result of the analysis outputted from the waveform analysis unit 3, an abnormality determination unit 5 for making a determination on the quality of the video signal, and a statistical processing unit 6.

The input unit 1 has the following input/output interfaces of four kinds (1) through (4): (1) a Rec. 601 component analog input; (2) a D1 serial input (digital signal input); (3) an NTSC signal input; and (4) a D2 serial input (digital signal input)

Since the Rec. 601 component analog input of (1) is an analog video signal, it is converted to a digital signal by A/D converters 11 and 12. The D1 serial input of (2) is a digital component signal. Since the signals of (3) and (4) are composite signals, they are separated into a Y (luminance) signal and a C (color-difference) signal by a Y/C separation circuit 13. Since this input unit 1 has been already known, detailed description thereof will be omitted.

The digital video signal outputted from the input unit 1 is stored in a Y memory 21 and a C memory 22 of the memory unit 2. The Y memory 21 and the C memory 22 are, for example, field memories. In order to make simultaneous read and write operation possible, each of the Y memory 21 and the C memory 22 is formed of a plurality of field memories. By the way, the luminous signal is stored in the Y memory 21, and the color-difference signal is stored in the C memory.

A concrete example will now be described. As for the component signal, a memory having a capacity of 720 pixels by 480 lines can be used as the Y memory, and a memory having a capacity of 360 pixels by 480 lines can be used as each of the memories for two color-difference signals. As for the composite signal, a memory having a capacity of 768 pixels by 480 lines can be used as the Y memory, and a memory having a capacity of 384 pixels by 480 lines can be used as each of the C memories for two color-difference signals. By the way, the luminance signal stored in the Y memory 21 and the color-difference signal stored in the C memory can be sent to, for example, a monitor device and converted to a visible video.

Figure 2:
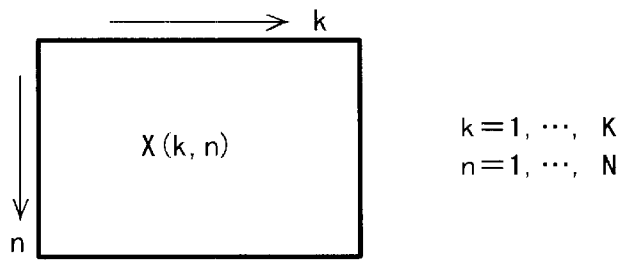
FIG. 2 is a diagram explaining an operation of a block division unit.

Video data stored in the memory unit 2 is sent to the waveform analysis unit 3. The waveform analysis unit 3 is formed of block division units 31 and 34, block characteristic calculation units 32 and 35, and average value separation/normalization units 33 and 36. As shown in FIG. 2, the block division units 31 and 34 divide each of the luminance signal and the color-difference signal into blocks having k pixels by n lines such as 8 pixels by 8 lines or 16 pixels by 8 lines, respectively. According to the following equations (1) and (2), the block characteristic calculation units 32 and 35 calculate an average value m and a variance $\sigma^2$.

$$m = \frac{1}{KN}\sum_{k=1}^{K}\sum_{n=1}^{N} X(k, n) \quad (1)$$

$$\sigma^2 = \frac{1}{KN}\sum_{k=1}^{K}\sum_{n=1}^{N} \{X(k, n) - m\}^2 \quad (2)$$

Here, x(k, n) indicates the amplitude of a pixel signal value.

The average value separation/normalization unit 33 for the luminance signal is supplied with the luminance signal data stored in the Y memory 21, and the average value my and the variance $\sigma^2 y$ of the block derived by the block characteristic calculation units 32. On the other hand, the average value separation/normalization unit 36 for the color-difference signal is supplied with the color-difference signal data stored in the C memory 22, and the average value mc and the variance $\sigma^2 c$ of the block derived by the block characteristic calculation unit 35.

According to the following equation (3), the average value separation/normalization unit 33 conducts average value separation and normalization on pixels x(k, n) inputted from the Y memory 21.

$$X(k, n) = \frac{1}{KN}\sum_{k=1}^{K}\sum_{n=1}^{N}(X(k, n) - m)\frac{\sigma 0}{\sigma} \quad (3)$$

Here, σ0 is a predetermined standard deviation value, and it can be given from the outside of the present apparatus.

Figure 3A:
FIGS. 3A through 3C are diagrams explaining an operation of an average value separation/normalization unit.
Figure 3B:
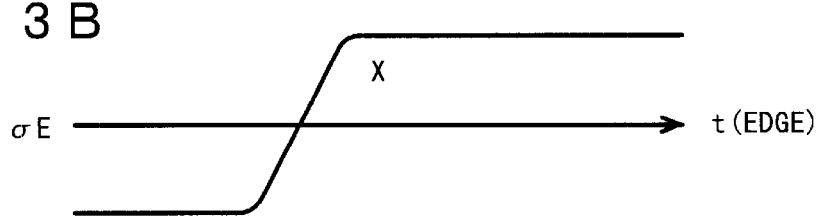
Figure 3C:
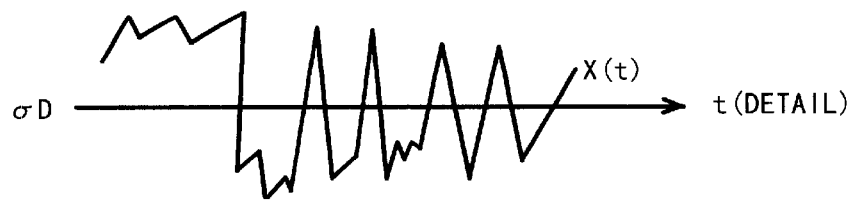

By referring to FIGS. 3A through 3C and 4A through 4C, the function of the average value separation/normalization unit 33 will now be described on the basis of a concrete example. If it is now assumed that the video inputted from the Y memory 21 is a flat picture such as blue sky, then the temporal change of a video signal x becomes small as shown in FIG. 3A. In an edge portion where the luminance of the video x abruptly changes as in a video in which a tree stands in the background of blue sky, the temporal change of the video signal x becomes as shown in FIG. 3B. Furthermore, in the case where the video x is a detailed video such as a video of a forest or hair, the temporal change of the video signal x becomes a sharp and large change as shown in FIG. 3C. In FIGS. 3A, 3B and 3C, σF, σE and σD represent standard deviation values of respective videos, and in general they are not equal.

Figure 4A:
FIGS. 4A through 4C are diagrams explaining an operation of an average value separation/normalization unit.
Figure 4B:
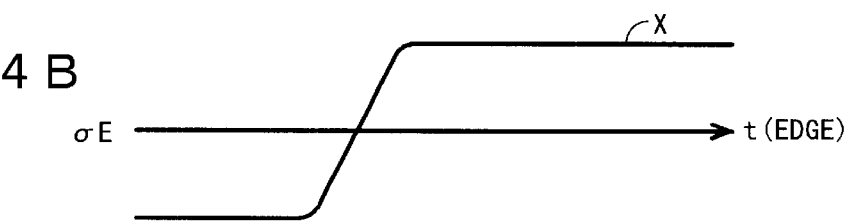
Figure 4C:
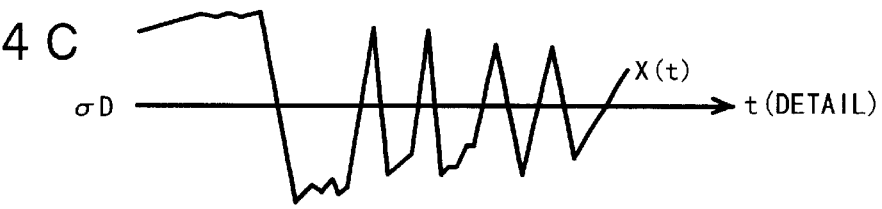

By conducting processing of the equation (3) on these video signals x, it is possible to obtain video signals removed AC power from the video signals of FIGS. 3A, 3B and 3C. video signals shown in FIGS. 4A, 4B and 4C are thus obtained, respectively. Here, all standard deviation values of respective video signals x of FIGS. 4A, 4B and 4C become the same value σ0 (σ0=σF=σE=σD). In the ensuing processing, therefore, analysis using only the waveform pattern becomes possible. The function of the average value separation/normalization unit 36 is also the same as that of the average value separation/normalization unit 33, and hence its description will be omitted.

video signals subjected to AC power removal in the average value separation/normalization units 33 and 36 are inputted to the 1/f fluctuation measurement unit 4. The 1/f fluctuation measurement unit 4 is formed of self-correlation function calculation units 40 and 45, correction processing units 41 and 46, Fourier transform execution units 42 and 47, 1/f parameter determination units 43 and 48, and fluctuation value measurement units 44 and 49.

Figure 5:
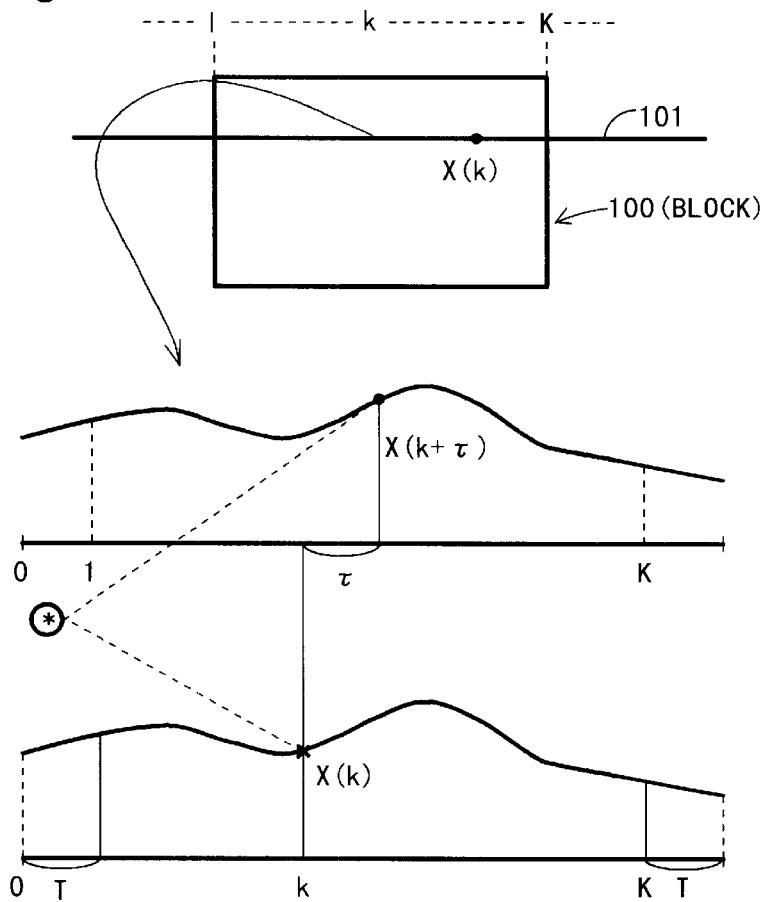
FIG. 5 is a diagram explaining an operation of a self-correlation function calculation unit.

The self-correlation function calculation unit 40 extracts one line 101 from a block 100 subjected to the average value separation/normalization as shown in FIG. 5, and derives a self-correlation coefficient R(τ) by using the following equation (4).

$$R(\tau) = \frac{1}{K}\sum_{k=1}^{K} X(k) \times X(k+\tau) \quad (4)$$

Here, τ is a deviation value of a pixel.

Figure 6:
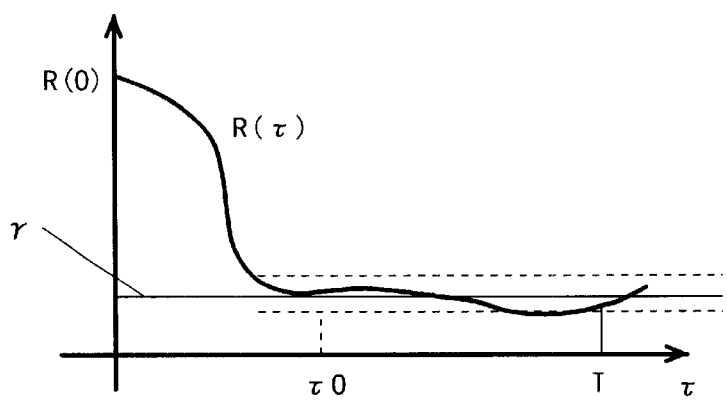
FIG. 6 is a diagram explaining an operation of a correction processing unit.

Subsequently, the self-correlation function calculation unit 40 derives self-correlation coefficients R(τ) for all lines included in the block 100, and derives an average value of the self-correlation coefficients R(τ) over all lines included in the block 100. The average value of the self-correlation coefficients R(τ) approximately takes a shape as shown in FIG. 6. The abscissa of FIG. 6 indicates the pixel deviation value τ, and the ordinate indicates the self-correlation coefficient R(τ).

Processing conducted in the correction processing unit 41 will now be described. First of all, as shown in FIG. 6, an average value γ of the self-correlation coefficient R(τ) over a range between parameters τ0 and T which can be given from the outside of the apparatus is derived by using the following equation (5).

$$\gamma = \frac{1}{T-\tau 0}\int_{\tau 0}^{T} R(\tau)d\tau \quad (5)$$

Figure 7:
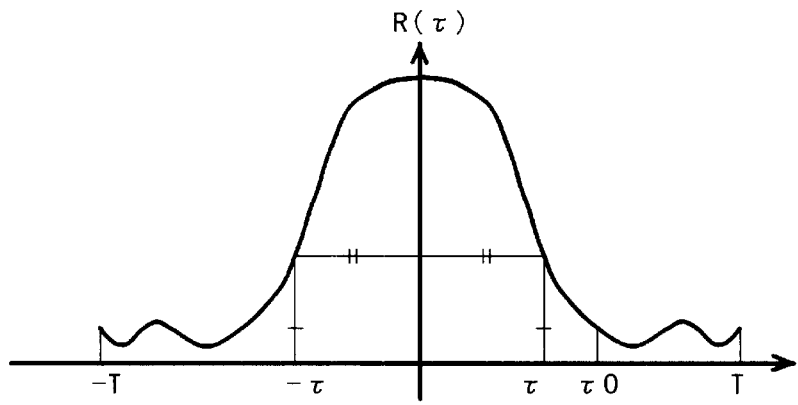
FIG. 7 is a diagram explaining an operation of a correction processing unit.
Figure 8:
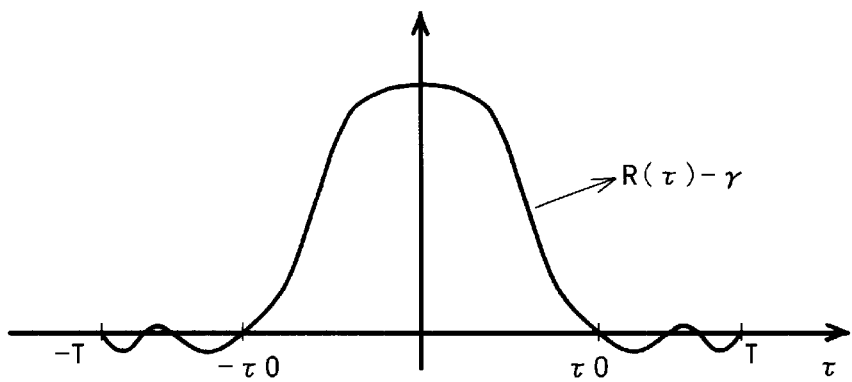
FIG. 8 is a diagram explaining an operation of a correction processing unit.

Subsequently, the self-correlation coefficient R(τ) of FIG. 6 is folded back to the τ≦0 side. By doing so, a waveform shown in FIG. 7 is obtained. Subsequently, processing represented as R(τ)→R(τ)−γ is conducted. As a result, a waveform as shown in FIG. 8 is obtained. By this processing, the average value over the range τ0≦|τ|≦T becomes 0. By the way, the reason why the self-correlation coefficient R(τ) of FIG. 6 is folded back to the τ≦0 side as shown in FIG. 7 is that the self-correlation coefficients R(τ) in both directions cannot be derived on the left and right ends of a video line.

Figure 9:
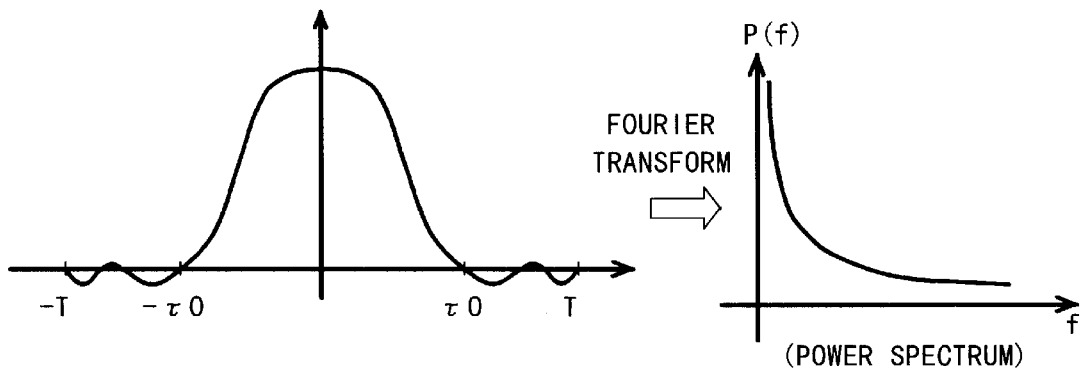
FIG. 9 is a diagram explaining an operation of a Fourier transform execution unit.

In the Fourier transform execution unit 42, the self-correlation coefficient R(τ) is then subjected to Fourier transform over the range τ0≦|τ|≦T as shown in FIG. 9, and a power spectrum of a function x(t) is derived. In a graph after the Fourier transform of FIG.9, the abscissa indicates the frequency f, and the ordinate indicates the power density P(f).

Figure 10:
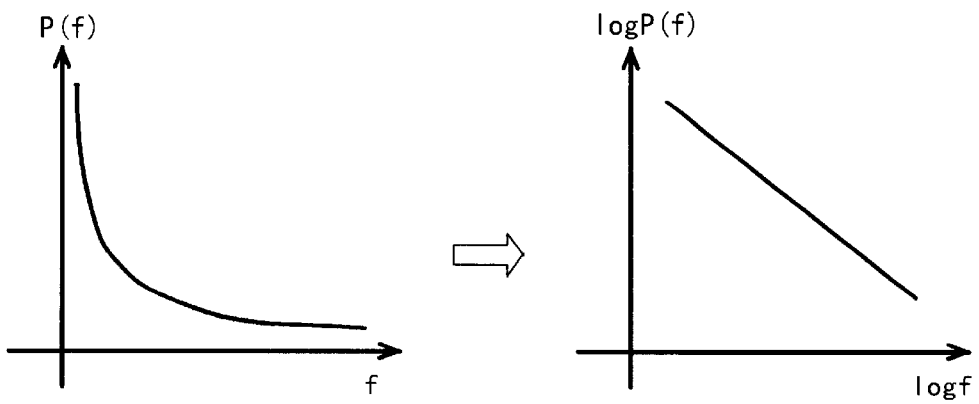
FIG. 10 is a diagram explaining an operation of a 1/f parameter determination unit.

Subsequently, as shown in FIG. 10, the 1/f parameter determination unit 43 converts the relation between the frequency f and a power density P(f) to a relation between log P(f) (ordinate) and log f (abscissa). By doing so, the relation can be approximated by a linear function of the following equation (6) as represented by a graph shown on the right side of FIG. 10.

$$\text{Log } P(f) = a \log f + b \quad (6)$$

Here, a and b are coefficients, and they can be found by using the least square approximation.

Figure 11:
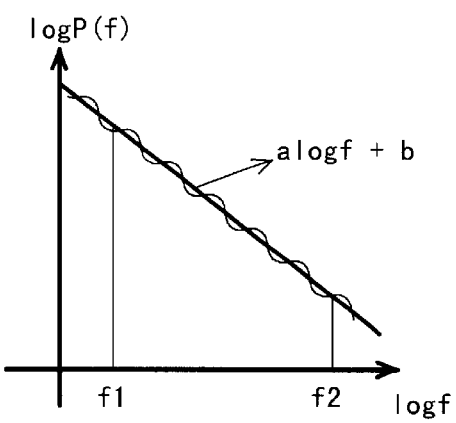
FIG. 11 is a diagram explaining an operation of a fluctuation value measurement unit.

Operation of the fluctuation value measurement unit 44 will now be described by referring to FIG. 11. By using the following equation (7), the fluctuation value measurement unit 44 derives a fluctuation value of the relation between log P(f) and log f in the actual video signal from the linear function given by the equation (6) over a range between a frequency f1 and f2, i.e., a fluctuation value B.

$$B = \int_{f1}^{f2} H(f) |\log P(f) - (a \log f + b)| df \quad (7)$$

By the way, the fluctuation value B is derived by weighting the frequency fluctuation in a filter H(f) and adding the weight fluctuation values in the frequency range between f1 and f2.

As shown in FIG. 1, the variance $\sigma^2$ of the equation (2), coefficients a and b of the equation (6), and the fluctuation value B of the equation (7) thus obtained are inputted to the abnormality determination unit 5. The abnormality determination unit 5 normalizes the coefficients a and b, and the fluctuation value B by using the following equations.

$$a' = (a+3.34)/1.49$$

$$B' = (B-40.16)/28.51$$

$$b' = (b-1.93)/2.21$$

By using a ic noise determination elliptic function, the abnormality determination unit 5 decides that the video quality is abnormal (N(d)) when the following condition (a) or (b) is satisfied. Otherwise, the abnormality determination unit 5 decides that the video quality is normal.

When $9.0 \leq \sigma$, $\{(a'-4.1)/5\}^2 + \{B'-4.3)/5.9\}^2 +$
$\{(b'-0.51a'-0.2)\}^2 \leq 1$ (a)

When $\sigma < 9.0$, $\{(a'+2.6)/6.6\}^2 + \{B'+0.1)/5.9\}^2 +$
$\{(b'-1.43a'+4.5)\}^2 \leq 1$ (b)

The way to make a determination on the video quality according to the conditions (a) and (b) is merely an example. It is apparent that other methods may also be used.

Heretofore, the operation of the 1/f fluctuation measurement unit 4 has been described by referring to the self-correlation function calculation unit 40, the correction processing unit 41, the Fourier transform execution unit 42, the 1/f parameter determination unit 43, and the fluctuation value measurement unit 44. However, the self-correlation function calculation unit 45, the correction processing unit 46, the Fourier transform execution unit 47, the 1/f parameter determination unit 48, and the fluctuation value measurement unit 49 for processing the color-difference signal also conduct the same operation. Therefore, the abnormality determination unit 5 can conduct a determination on video abnormality for each of the video luminance signal and two color-difference signals.

Figure 12:
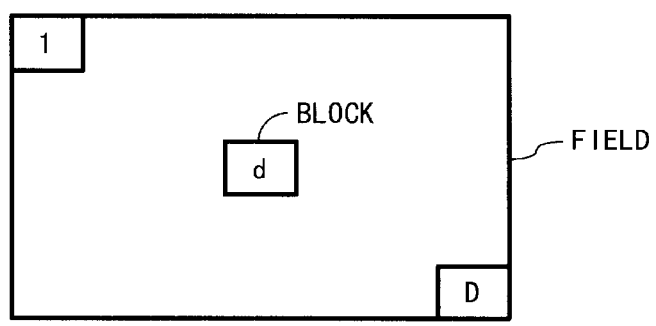
FIG. 12 is a diagram showing a field and a block.

If, for example, a determination of video abnormality N(d) is made for the luminance signal and two color-difference signals of one block d shown in FIG. 12 as heretofore described, these abnormality determination results N(d) are sent to the statistical processing unit 6. In order to process the abnormality determination results N(d) by taking a field as the unit, the statistical processing unit 6 derives Ntotal by using the following equation (8).

$$N\text{total} = \sum_{d=1}^{D} N(d) \quad (8)$$

According to the following criteria (1) through (4), the statistical processing unit 6 then makes a determination as to whether a field is normal or abnormal for each of the luminance signal and two color-difference signals.

(1) Ntotal=0→Complete normal field
(2) 0<Ntotal<Th1→There is an isolated abnormality in the field
(3) Th1<Ntotal≦Th2→There are abnormalities partially in the field
(4) Th2<Ntotal→There are abnormalities nearly over the entire field In addition, the statistical processing unit 6 derives the average fluctuation value and the average variance of the field by using the following equations (9) and (10).

$$\bar{B} = \frac{1}{D}\sum_{d=1}^{D} B \qquad (9)$$

$$\bar{\sigma} = \sqrt{\frac{1}{D}\sum_{d=1}^{D} \sigma^2} \qquad (10)$$

As heretofore described, it becomes possible according to the present embodiment to make a determination as to whether the video is normal or abnormal in real time without intervention of a person. While the present invention has been described with reference to one embodiment, it is a matter of course that the present invention is not limited to the embodiment, but modifications which do not depart from the spirit of the present invention fall in the scope of the present invention.

According to the present invention, a video base band signal is taken in, a power spectrum is derived by taking a small block as the unit, and a video quality abnormality is detected by using the 1/f fluctuation value analysis, as apparent from the foregoing description. In real time, therefore, a video quality abnormality can be detected with high precision. In addition, the video quality abnormality can be detected mechanically without the intervention of a person.

In a picture of a flower garden serving as a test video, the present inventor purposely created a video portion having a favorable quality and a video portion having a poor quality. The present inventor then measured the Fourier transform fluctuation value of the self-correlation function according to the present invention. Its results are shown in FIG. 13. In FIG. 13, a broken line "a" represents fluctuation of an original video from an approximate straight line a1. A solid line "b" represents fluctuation of a video of the portion having a favorable quality from an approximate straight line b1. A chain line "c" represents fluctuation of a video of the portion having a poor quality from an approximate straight line c1. From the data, the fluctuation value B of the video having a poor quality becomes large. The effect of the present invention has thus been ascertained. In addition, similar tests were conducted by using other test videos. In these videos as well, the effect of the present invention was confirmed.

What is claimed is:

1. A video quality abnormality detection method comprising the steps of:
    dividing a digitized video signal into a plurality of blocks;
    normalizing an original signal with each of divided blocks, as a unit, so as to make a power sum of an AC component constant;
    deriving a power spectrum on the basis of data resulting from the normalizing;
    deriving a fluctuation value from an approximate straight line of the power spectrum and the power spectrum; and
    detecting the video quality abnormality from at least a variance of the signal of the block, coefficients of the approximate straight line, and the fluctuation value of the power spectrum.

2. A video quality abnormality detection apparatus comprising:
    storage means for storing a digitized luminance signal and a color-difference signal;
    variance value computation means for dividing the luminance signal and the color-difference signal stored in the storage means into blocks, and deriving variance values of each block;
    normalization means for deriving normalized signals each having a constant variance value, on the basis of the variance values derived by the variance value computation means;
    self-correlation function correction processing means for deriving average self-correlation functions within the block from the normalized signals outputted from the normalization means, folding back each of the average self-correlation functions to a negative side, and making the average self-correlation functions over a predetermined section equal to 0 or nearly 0;
    power spectrum straight line approximation means for conducting Fourier transform on the self-correlation functions derived by the self-correlation function correction processing means, deriving power spectra, and approximating the power spectra by straight lines;
    fluctuation value computation means for deriving fluctuation values of the power spectra from the approximate straight lines; and
    a means for making a determination on video abnormality on the basis of the variance values derived by the variance value computation means, coefficients of the approximate straight lines derived by the power spectrum straight line approximation means, and the fluctuation values derived by the fluctuation value computation means.

3. A video quality abnormality detection apparatus according to claim 2, wherein the normalization means divide the original signals obtained from the storage means by the variance values.

4. A video quality abnormality detection apparatus according to claim 2, wherein the power spectrum straight line approximation means approximate each of the power spectra by "a log f+b", where a and b are coefficients, and f is a frequency.

5. A video quality abnormality detection apparatus according to claim 4, wherein the fluctuation value computation means add together absolute values of difference between each of the power spectra and the straight line "a log f+b" over a predetermined section of the frequency f.

* * * * *